US006344891B1

United States Patent (12)

Imai

(10) Patent No.: US 6,344,891 B1

(45) Date of Patent: Feb. 5, 2002

(54) PRINTER USABLE WITH RECORDING MATERIAL OF PLURAL TYPES

(75) Inventor: Ryo Imai, Saitama (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/578,482

(22) Filed: May 26, 2000

(30) Foreign Application Priority Data

May 28, 1999 (JP) .......................................... 11-150659

(51) Int. Cl.[7] ........................ G03B 27/52; G03B 27/44; B41M 5/20; B41J 2/32; B41J 2/325

(52) U.S. Cl. ............................ 355/40; 355/46; 355/54; 503/201; 347/171; 347/174; 347/177

(58) Field of Search ............................ 355/40, 46, 54, 355/112; 503/200, 201; 400/225, 237, 618; 348/207, 558; 347/171, 174, 177, 176, 178, 217; 358/296; 399/75

(56) References Cited

U.S. PATENT DOCUMENTS

| | | | | | |
|---|---|---|---|---|---|
| 4,496,955 | A | * | 1/1985 | Maeyama et al. | 347/178 |
| 4,590,490 | A | * | 5/1986 | Takanashi et al. | 347/176 |
| 4,893,951 | A | * | 1/1990 | Iwatani et al. | 400/225 |
| 5,093,730 | A | * | 3/1992 | Ishii et al. | 358/296 |
| 5,101,222 | A | * | 3/1992 | Hakkaku | 347/175 |
| 5,172,180 | A | * | 12/1992 | Ohshima et al. | 399/75 |
| 5,579,116 | A | * | 11/1996 | Sugiyama et al. | 358/296 |
| 5,691,961 | A | * | 11/1997 | Paranjpe | 347/217 |
| 5,807,000 | A | * | 9/1998 | Kawamura et al. | 400/237 |
| 5,835,136 | A | * | 11/1998 | Watanabe et al. | 348/207 |
| 5,990,919 | A | * | 11/1999 | Bobb et al. | 347/217 |
| 6,153,557 | A | * | 11/2000 | Nakanishi | 503/201 |

* cited by examiner

*Primary Examiner*—Russell Adams
*Assistant Examiner*—Rodney E. Fuller
(74) *Attorney, Agent, or Firm*—Sughrue Mion, PLLC

(57) ABSTRACT

A thermal printer includes a thermal head, which records an image to a recording material. Feeder rollers feed the recording material relative to the thermal head. An EEPROM stores first distance data adapted to image recording to a predetermined first type of the recording material. A keyboard inputs second distance data representing a second type of the recording material at a time of image recording to the second type. A personal computer causes the feeder rollers to set the first and second types to the thermal head according to respectively the first and second distance data, and drives the thermal head and feeder rollers in synchronism. The image is recorded in first and second printing regions suitable to respectively the first and second types.

23 Claims, 11 Drawing Sheets

50

| NUMERAL | DISTANCE A (mm) | DISTANCE B (mm) |
|---|---|---|
| 1 | 3 | 5 |
| 2 | 5 | 7 |
| 3 | 7 | 9 |

PRINTER USABLE WITH RECORDING MATERIAL OF PLURAL TYPES

BACKGROUND OF THE INVENTION

1. Field of the Invention

The present invention relates to a printer usable with recording material of plural types. More particularly, the present invention relates to a printer in which images can be printed to recording material selected from plural types with image quality kept high.

2. Description Related to the Prior Art

There is a printer known with a trade name of "Print Club", which is an automatic portrait producing machine including a pick-up camera for picking up an object to obtain data of an object image or a portrait image.

In the printer, an image or portrait of a user or purchaser, being picked up, is printed to recording material. The recording material is a sticker, and may include preprinted additional images such as peripheral line images, background images, foreground images, character images and the like. The recording material has layers including a sticker sheet, an adhesive layer and release paper, from which the sticker sheet is peelable. Sticker regions are arranged in a matrix form. Each of the sticker regions has a shape of a rectangular quadrilateral, and is defined inside half cut lines, which separate the sticker sheet and adhesive layer, and under which the release paper is uncut. For each of the sticker regions, a thumbnail image is printed in the recording material. The sticker regions are peeled from the release paper, and can be stuck to a cardboard and other various objects desired by the user.

If thumbnail images arranged in a matrix form are printed in a position shifted from the sticker regions, there is failure in the printing due to lost portions of the images outside the sticker regions or excessive blank margins inside the sticker regions.

If an acceptable type of the recording material is not used in the printer, it is likely that there occurs breakage in the printer, or drop in the image quality due to differences in the size or thickness of the recording material. In the direct thermal recording, the recording material includes a base sheet, and three thermosensitive coloring layers of cyan, magenta and yellow. Coloring characteristics of the layers are changed according to a condition of preserving the recording material, to influence the quality of prints. In addition to the recording material of the direct thermal recording type, the drop in the image quality occurs other types including thermal development transfer recording material, a sublimation type of thermal transfer recording material, and the like. The preserving condition is changed also by changes in a distribution route. There is no known technique for ensuring the use of the recording material of a genuine type supplied by an exclusive distribution route.

SUMMARY OF THE INVENTION

In view of the foregoing problems, an object of the present invention is to provide a printer usable with recording material of plural types, in which the recording material can be positioned exactly even for any of the plural types.

Another object of the present invention is to provide a printer usable with recording material of plural types, prevented from being loaded with the recording material that is different from the plural types and not genuine, to avoid drop in the image quality and breakage of the printer.

In order to achieve the above and other objects and advantages of this invention, a printing head records an image to a recording material. A feeder feeds one of the recording material and the printing head relatively to a remaining one thereof. A memory stores first position information adapted to image recording to a predetermined first type of the recording material. An input unit inputs type changing information representing a second type of the recording material at a time of image recording to the second type, to set second position information. A control unit causes the feeder to set the first and second types to the printing head according to respectively the first and second position information, and drives the printing head and the feeder in synchronism, the image being recorded in first and second printing regions suitable to respectively the first and second types.

The first and second position information is constituted by respectively first and second distances and associated with the first and second printing regions. Furthermore, a length measurer measures a feed length of the recording material with reference to the printing head. The control unit monitors the feed length while the feeder operates, and the first and second printing regions are set at the printing head respectively when the feed length comes up to the first and second distances.

The recording material includes a positioning indicia disposed in a predetermined position. Furthermore, an indicia sensor detects the positioning indicia in the recording material. The control unit monitors the feed length in response to detection of the positioning indicia by the indicia sensor.

The control unit writes the second position information to the memory in place of the first position information in response to the type changing information.

Furthermore, a lid covers the input unit. A lock mechanism keeps the lid closed to disable external operation to the input unit, the lock mechanism allowing the lid to open in response to unlocking operation, to enable the input unit to operate.

The input unit is externally operated to input the type changing information.

The memory is EEPROM. The second position information is the type changing information, or information obtained according to the type changing information and a predetermined calculation equation.

The input unit further inputs a predetermined special signal externally. The control unit allows setting of the second position information upon recognition of the special signal.

The feeder includes a stepping motor, supplied with drive pulses by the control unit, for rotating to feed the recording material. The length measurer includes a pulse counter for counting the drive pulses to obtain a pulse number representing the feed length.

In a preferred embodiment, the second type is predetermined. The memory further stores the second position information. The control unit selectively reads the first and second position information according to presence and absence of the type changing information.

The memory stores table data in which an address is type information of at least the first and second types, and which is constituted by at least the first and second position information. The type changing information is the type information of at least the second type.

In another preferred embodiment, the recording material includes discernment information of one recording material type. Furthermore, an information reader reads the discernment information from the recording material. The memory further stores type information of the first and second types. The control unit detects which of the first and second types the recording material is according to the type information and the discernment information. The input unit is operated if the recording material is the second type.

If the discernment information is different from the type information, the control unit inhibits the printing head from operating and/or generates an alarm signal.

The discernment information is a size of the positioning indicia in a feeding direction. The information reader is constituted by the indicia sensor and the length measurer.

In a further preferred embodiment, the discernment information is one of a shape of the positioning indicia, a size or pitch of the positioning indicia in a feeding direction, and a size of the positioning indicia as viewed crosswise to the feeding direction. The information reader includes the indicia sensor.

In another preferred embodiment, the memory further stores a predetermined tolerable condition predetermined to allow the printing head to operate by changing a recording material feeding condition for recording material different from the first and second types. If the recording material is different from the first and second types, the control unit checks the discernment information according to the tolerable condition, and when the discernment information satisfies the tolerable condition, allows the printing head to operate.

The first and second types include respectively first and second cuttable lines, formed along a periphery of the first and second printing regions, for keeping the first and second printing regions cuttable away.

The first printing region includes a first group of plural subregions, the second printing region includes a second group of plural subregions, and the image is recorded in each of the subregions. The first and second cuttable lines are formed along a periphery of the subregions included in respectively the first and second groups.

The first and second position information is so determined that a distance between the first cuttable line and an edge of the first printing region is set equal to a distance between the second cuttable line and an edge of the second printing region.

The feeder feeds the recording material. The first and second position information is so determined that the first and second printing regions extend downstream from the first and second cuttable lines with reference to a feeding direction.

In still another preferred embodiment, the first and second types include respectively first and second preprinted pattern images preprinted close to a periphery of the first and second printing regions.

The feeder feeds the recording material. The first and second printing regions have first and second printing starting edges positioned downstream with reference to a feeding direction. The first and second preprinted pattern images include a predetermined reference portion. The first and second position information is so determined that a distance between the reference portion and the first printing starting edge is set equal to a distance between the reference portion and the second printing starting edge.

The recording material is a sticker.

Furthermore, a pick-up unit for picking up an object to generate image data of the image. The printing head records the image to the recording material according to the image data.

Furthermore, an additional image memory for stores the image data of a predetermined additional image. An image combining circuit produces image data of a combined image by combining the image and the additional image. The printing head records the combined image to the recording material according to the image data of the combined image.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figures 1, 9:
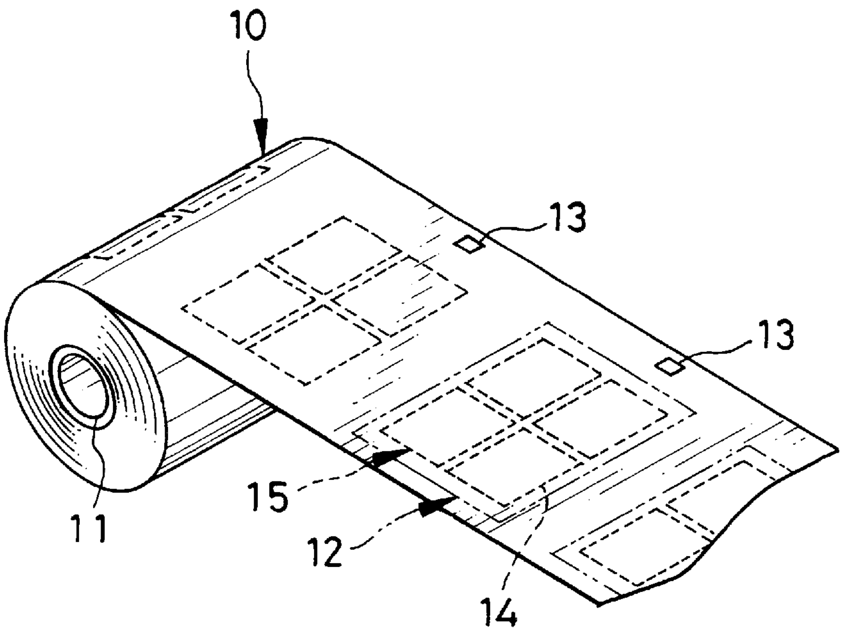
FIG. 1 is a perspective illustrating recording material for use with a thermal printer.
FIG. 9 is a table illustrating table data constituted by plural combinations of distance data A and B.

In FIG. 1, a recording sticker material 10 is illustrated. The recording material 10 is a continuous type and wound about a core 11. The recording material 10 has a recording surface, which is faced toward the core 11, and adapted to thermal recording of an image. A printing region 12 is defined as a region subjected to the thermal recording by use of a thermal head. On a back surface of the recording material 10, positioning indicia 13 are preprinted in association with the printing region 12. The positioning indicia 13 are arranged at a regular pitch, and are detected to set a position of starting printing. Thus, the printing region 12 is formed in the recording material 10 successively at a regular pitch. Cuttable lines 14 are formed in the recording material 10, and define sticker regions 15 of a rectangular shape.

Figure 2:
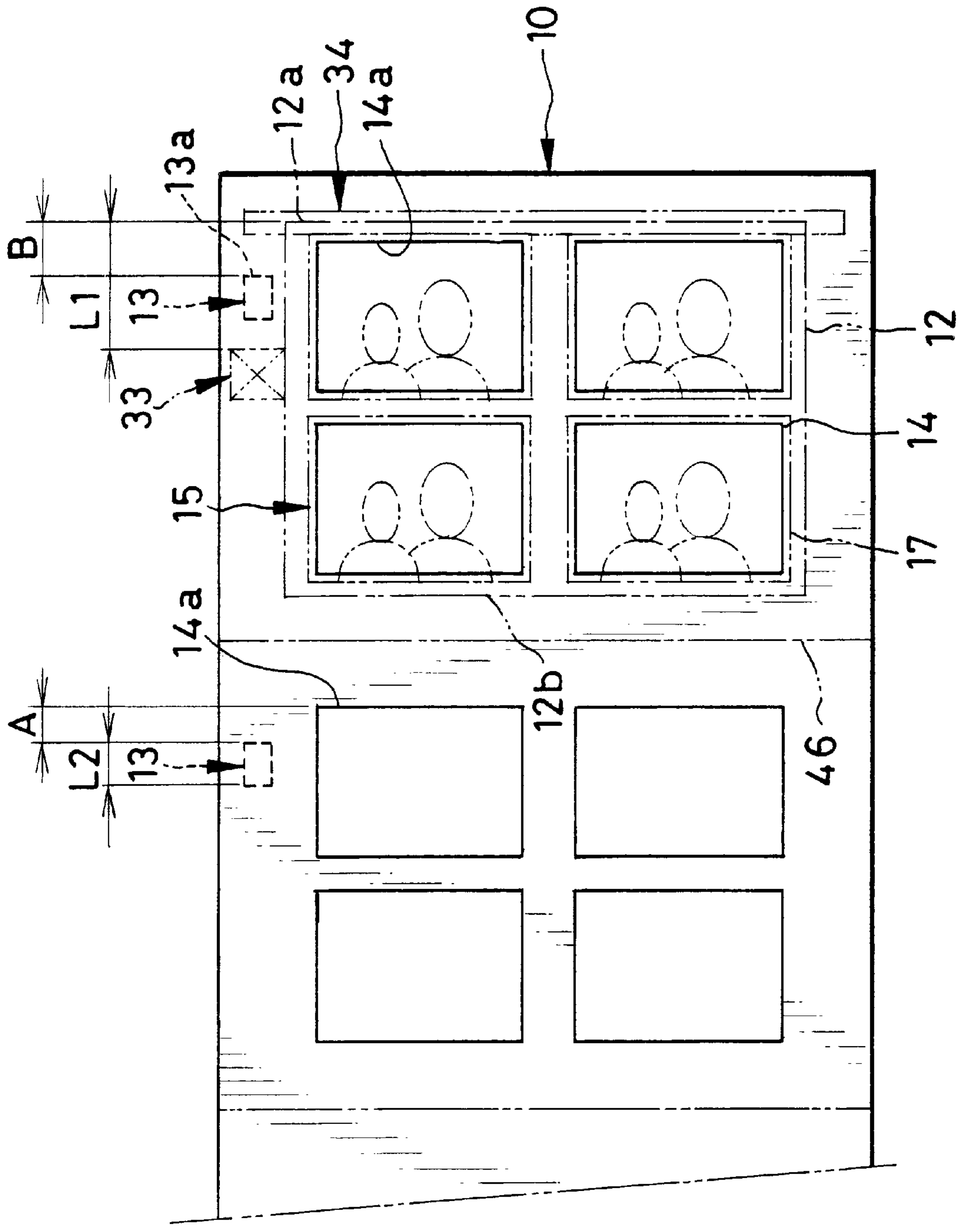
FIG. 2 is an explanatory view in plan illustrating the recording material and thumbnail images together with elements in the thermal printer.

In FIG. 2, the four sticker regions 15 are arranged in the recording surface to divide the printing region 12 into four, and in a manner of a matrix of two rows and two columns. The cuttable lines 14 are half cuts, which separate a sticker sheet and adhesive layer of the recording material 10, and under which release paper of the recording material 10 is uncut. Thus, the sticker regions 15 can be easily peeled from the release paper, and become attachable as sticker pieces. Two of the sticker regions 15 disposed in the downstream direction have a cuttable line segment 14*a*. Each of the positioning indicia 13 has an indicia starting edge 13*a*, and is away from the cuttable line segment 14*a* by a distance A. The distance A is, for example, 3 mm.

A printing starting edge 12*a* of the printing region 12 is determined by referring to the position of the positioning indicia 13. The indicia starting edge 13*a* of the positioning indicia 13 is away from the printing starting edge 12*a* by a distance B, which is, for example, 5 mm. Accordingly, printing operation is started with a surplus space of 2 mm with reference to the cuttable line segment 14*a* of the sticker regions 15. Thumbnail images 17 are recorded in the sticker regions 15 without an unwanted shift. Note that the size of the thumbnail images 17 is predetermined larger than the sticker regions 15 by a small amount, for the purpose of preventing creation of blank margins about the thumbnail images 17 even when the thumbnail images 17 are shifted accidentally.

The sticker sheet is constituted by a color thermosensitive recording material well-known in the art, and includes a base sheet, three thermosensitive coloring layers of cyan, magenta and yellow, and a transparent protective layer. Among those, the cyan coloring layer is positioned the nearest to the base sheet, and has the lowest heat sensitivity, and develop a cyan color in response to application of comparatively high heat energy. The magenta coloring layer is positioned in the middle of the three and has the middle heat sensitivity. The yellow coloring layer is positioned the farthest from the base sheet, has the highest heat sensitivity, and develops a yellow color in response to application of comparatively small heat energy.

Intermediate layers are disposed between the coloring layers for adjusting the heat sensitivity. Also, a back layer is overlaid on a back surface of the base member. An adhesive layer is overlaid on the back surface in such a manner that the base member is peelable at the adhesive layer. Note that it is possible to use other recording material in which the order of the coloring layers is changed. In such an alternative recording material, one of the layers positioned the most deeply has the lowest heat sensitivity, which is similar to the first recording material. The protective layer disposed farthest from the base member is formed from transparent resin of which a main component is polyvinyl alcohol (PVA), and protects the coloring layers from being scratched or damaged.

The yellow and magenta coloring layers have fixability in response to electromagnetic rays, and are fixed to prevent remainder of coloring components from developing color in the course of heating of the coloring layers next to be colored. The magenta coloring layer has a maximum absorption wavelength of approximately 365 nm. When ultraviolet rays of a wavelength range with a peak of 365 nm are applied to the magenta coloring layer, the coloring ability of the layer is destroyed. The yellow coloring layer has a maximum absorption wavelength of approximately 420 nm. When visible violet rays of a wavelength range with a peak of 420 nm are applied to the yellow coloring layer, the coloring ability of the layer is destroyed.

Figure 3:
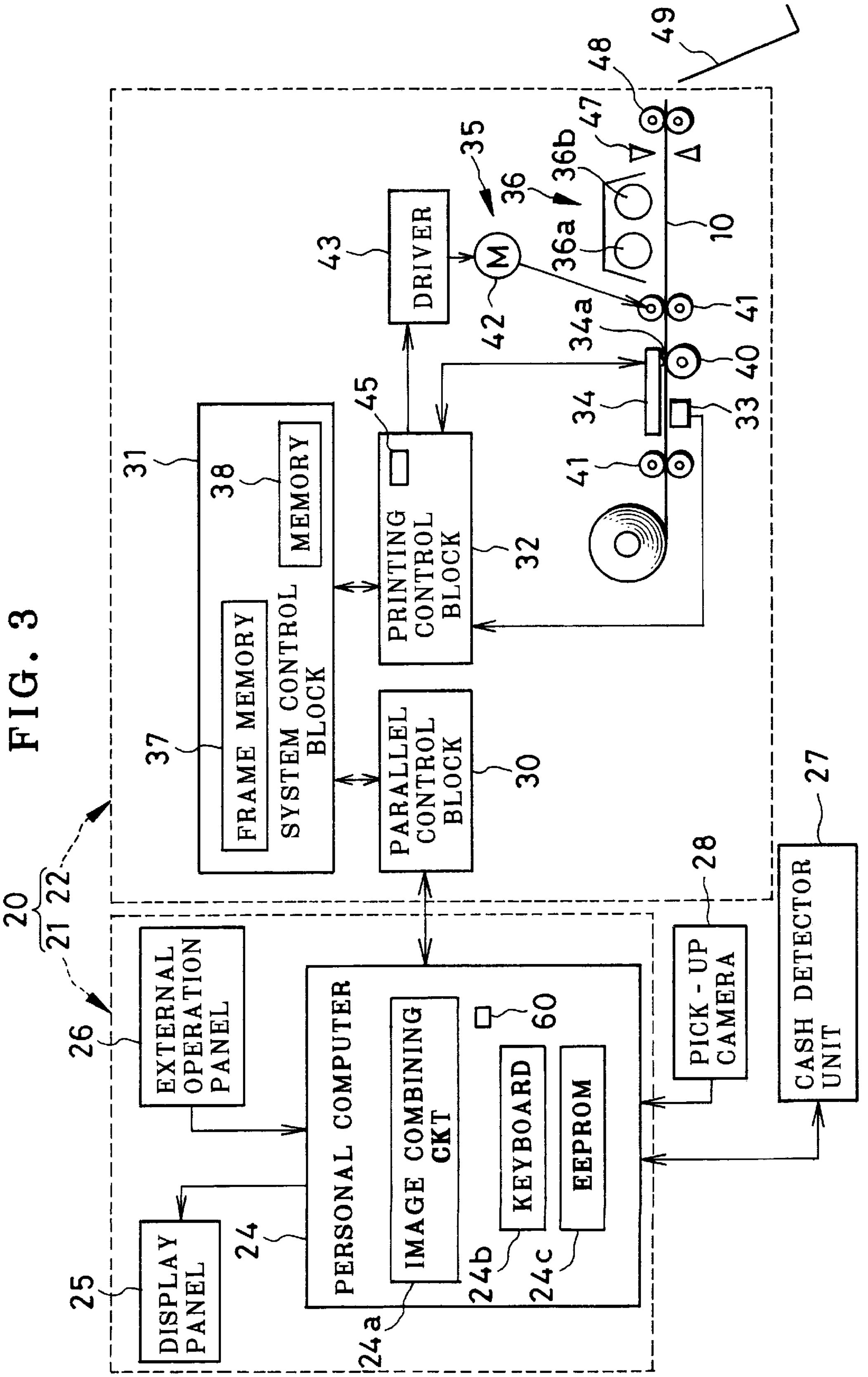
FIG. 3 is a block diagram schematically illustrating the thermal printer.
Figure 4:
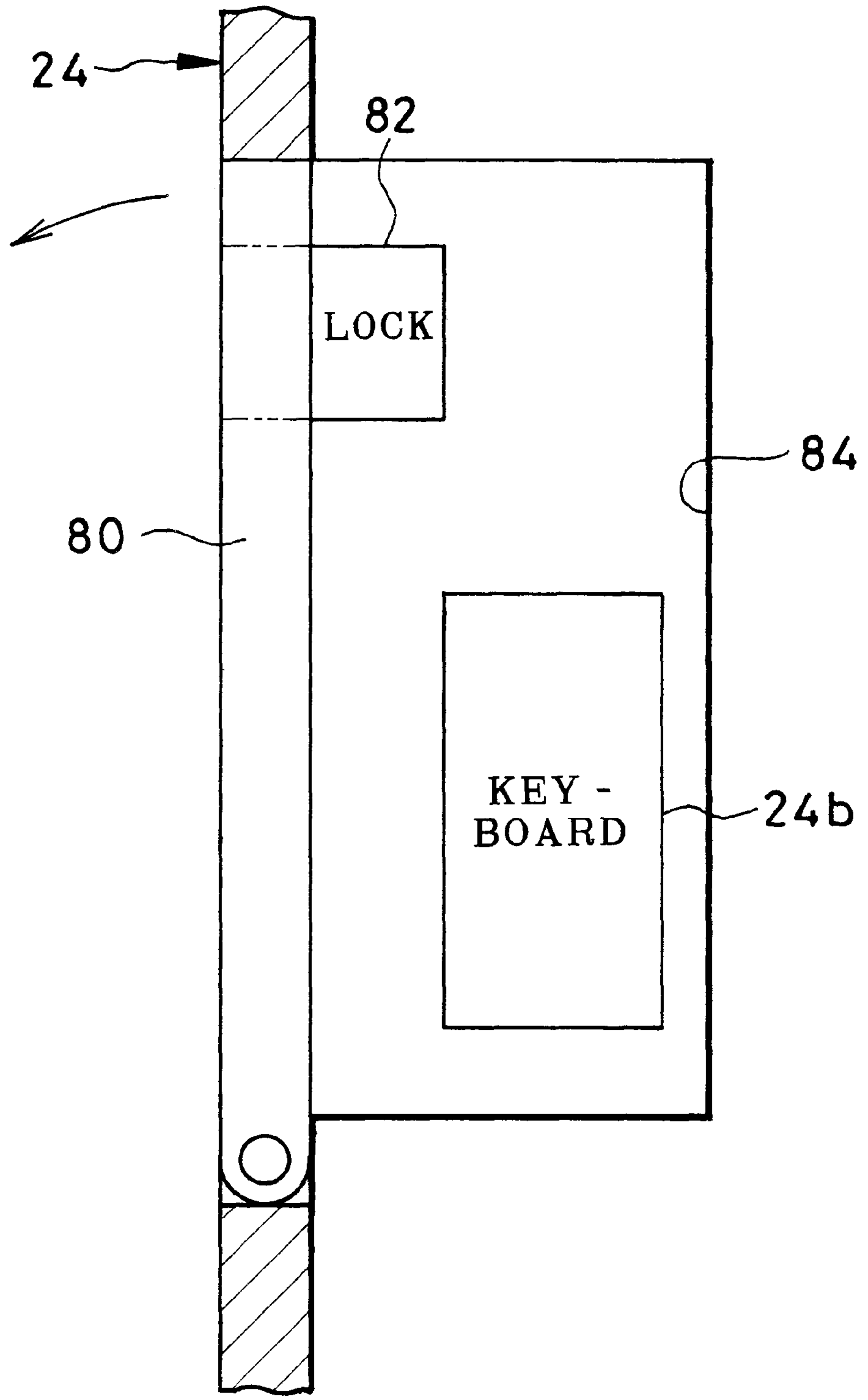
FIG. 4 is an explanatory view illustrating a chamber in a printer with a locked lid and a keyboard.

In FIG. 3, a thermal printer 20 or automatic portrait producing machine of the present invention is schematically illustrated. The thermal printer 20 is generally constituted by a host computer 21 and thermal printer section 22. The host computer 21 is constituted by a personal computer 24 as a control unit, and includes a keyboard 24*b* as an input unit, a display panel 25, and an external operation panel 26. As illustrated in FIG. 4, the keyboard 24*b* is located in a chamber 84 covered by a lid 80, and is kept not accessible externally by a lock mechanism 82, but becomes operable when the lid 80 is unlocked and opened.

Figure 5:
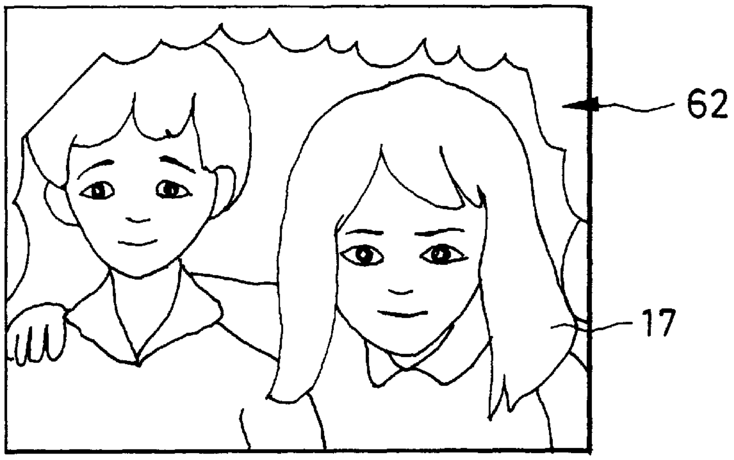
FIG. 5 is a plan illustrating an example of an additional image.

A cash detector unit 27 and pick-up camera 28 are connected with the host computer 21. The cash detector unit 27 detects an amount of coins or bills, and pays out coins to be returned to a purchaser or user. The pick-up camera 28 picks up an image of an upper half of a body of the purchaser. The host computer 21 effects successive controls of processes including detection of cash and ejection of prints. Upon insertion of cash, the display panel 25 is driven to indicate a menu. The user operates the external operation panel 26 by referring to instructions in the menu. As is well-known in the art, a portrait image of the user is picked up. A desired one of additional images is selected from preset images, such as peripheral line images, background images, foreground images, character images and the like. Then an image combining circuit 24*a* produces image data by combining the portrait image and additional image. One example of additional image 62 in the combined image is illustrated in FIG. 5. An additional image memory 60 stores image data of the additional image 62.

The thermal printer section 22 is constituted by a parallel control block 30, a system control block 31, a printing control block 32, an indicia sensor 33 in an information reader, a thermal head 34 as printing head, a recording material feeder 35, and an optical fixer 36. A platen roller 40 presses the recording material 10 toward a heating element array 34*a* of the thermal head 34. The feeder 35 is constituted by a feeder roller set 41, stepping motor 42, and driver 43. The feeder roller set 41 is a pair of feeder rollers. The stepping motor 42 rotates the feeder roller set 41. The driver 43 drives the stepping motor 42.

The parallel control block 30 transfers image data from the host computer 21 and a printing instructing command signal to the system control block 31, and transfers various state signals from the thermal printer section 22 to the host computer 21.

The system control block 31 includes a frame memory 37, which stores image data sent from the host computer 21. The system control block 31 controls the thermal printer section 22. The printing control block 32 controls the thermal head 34 in the course of printing, effects image processing, and controls feeding of the recording material 10.

An EEPROM (electrically erasable programmable read only memory) 24*c* as a non-volatile memory in the host computer 21 stores distance data B of a distance from the positioning indicia 13 to the printing starting edge 12*a* of the printing region 12. It is possible in EEPROM 24*c* to rewrite the distance data B by inputting a special signal from the keyboard 24*b*.

Figure 6:
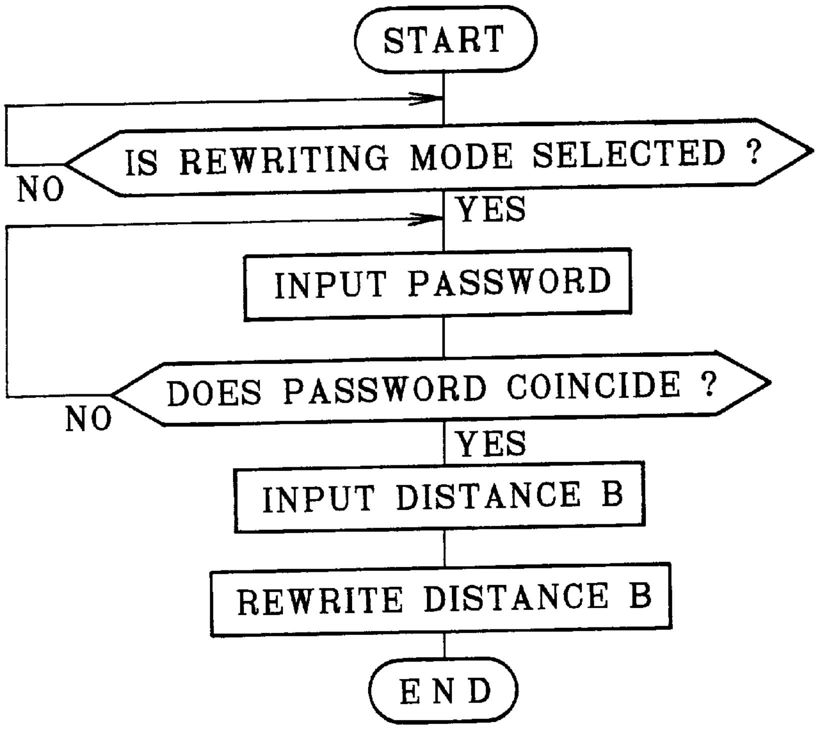
FIG. 6 is a flow chart illustrating a process of rewriting a reference value.

In FIG. 6, a flow of rewriting the data is illustrated. The data is rewritten only by servicemen or specialized operators, who are designated by the manufacturer of the thermal printer 20 and travel in a local region in which the shop having the thermal printer 20 is located. In the thermal printer 20, the display panel 25 externally indicates an instruction for inputting a password. If the password being input does not coincide with a password previously stored in the memory, then inputting of distance data is inhibited. Also, if no password is input, the same inhibition is effected.

An operator inputs a value of the distance data B corresponding to the recording material 10 supplied from a proper distribution route. If the recording material 10 is supplied from distribution routes other than this, the thumbnail images 17 cannot be recorded in exact positions in the sticker regions 15 for the reasons of the difference in the distance data B. Recorded positions of the thumbnail images 17 are offset from the sticker regions 15. But the use of the password makes it possible to supply the recording material 10 from the proper distribution route, so high quality in printing can be ensured. There occurs no breakage of the thermal printer 20 due to the improper recording material 10. As the distance data B is changeable, it is possible to produce prints from the recording material 10 with a changed value of the distance A from the positioning indicia 13 to the cuttable line segment 14*a* of the sticker regions 15.

Figure 7:
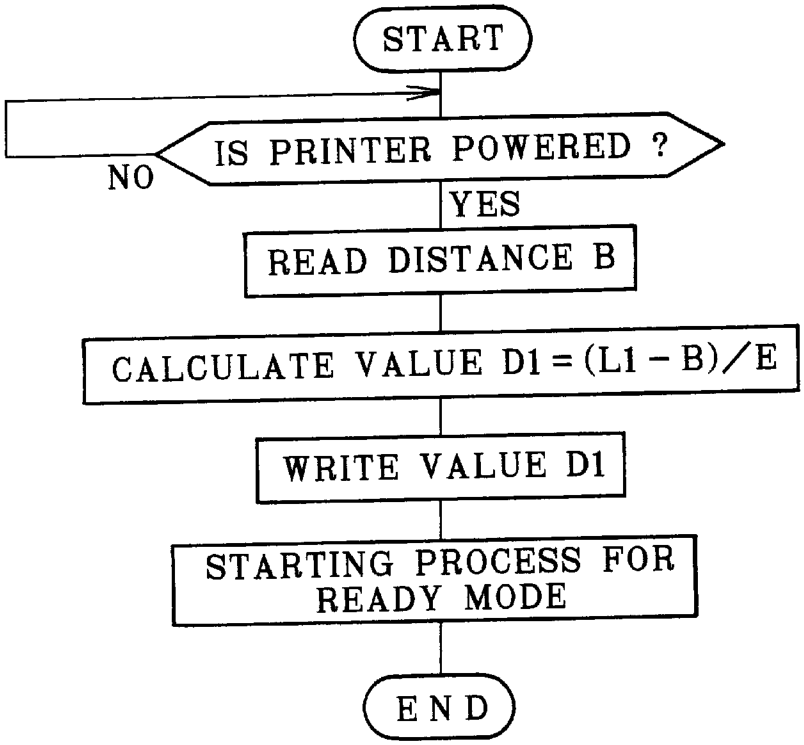
FIG. 7 is a flow chart illustrating a process of calculating a reference value.

The operation of the thermal printer 20 is described now. In FIG. 7, the thermal printer 20 is powered. The host computer 21 reads the distance data B from EEPROM 24*c* of the personal computer 24, and calculates the reference value D1 for determining a printing starting position. For the reference value D1, the distance data B is subtracted from the distance L1 between the indicia sensor 33 and heating element array 34*a*. A difference (L1−B) is divided by a unit feeding amount E defined as an amount of feeding the recording material 10 by one drive pulse. Thus, the reference value D1=(L1−B)/E is obtained, and is stored in a memory in the personal computer 24. Also, the same reference value D1 is stored in a memory 38 in the system control block 31, which will be described later.

After this, the host computer 21 effects a starting process and sets a ready mode in which various components in the printer stand by for printing operation. In the ready mode, the display panel 25 is caused to indicate steps in the printing operation, a simulated image of a print, and the like. A user inserts coins or bills into the cash detector unit 27 at an amount instructed by the display panel 25. Thus, the host computer 21 sets a pick-up mode. In the pickup mode, the display panel 25 indicates steps of picking up a portrait image and combining an additional image with the portrait image. The user or purchaser operates the external operation panel 26 to pick up the portrait and effect the image combination or synthesis. The combined image is displayed. When the user inputs a confirmation signal by operating the external operation panel 26, the combined image is confirmed. In response, the host computer 21 sets a printing mode. The host computer 21 in the printing mode transfers a printing command signal to the thermal printer section 22 and image data of an image to be printed.

When the host computer 21 is in the printing mode, the system control block 31 receives the image data and executes printing in response to the parallel control of the host computer 21. The image data is sent from the parallel control block 30 and written to the frame memory 37 in the system control block 31. A printing executing command signal and the reference value D1 or start position data for designating the printing starting position are sent from the parallel control block 30 to the system control block 31, and written to the memory 38. So the printing operation is started.

Figure 8A:
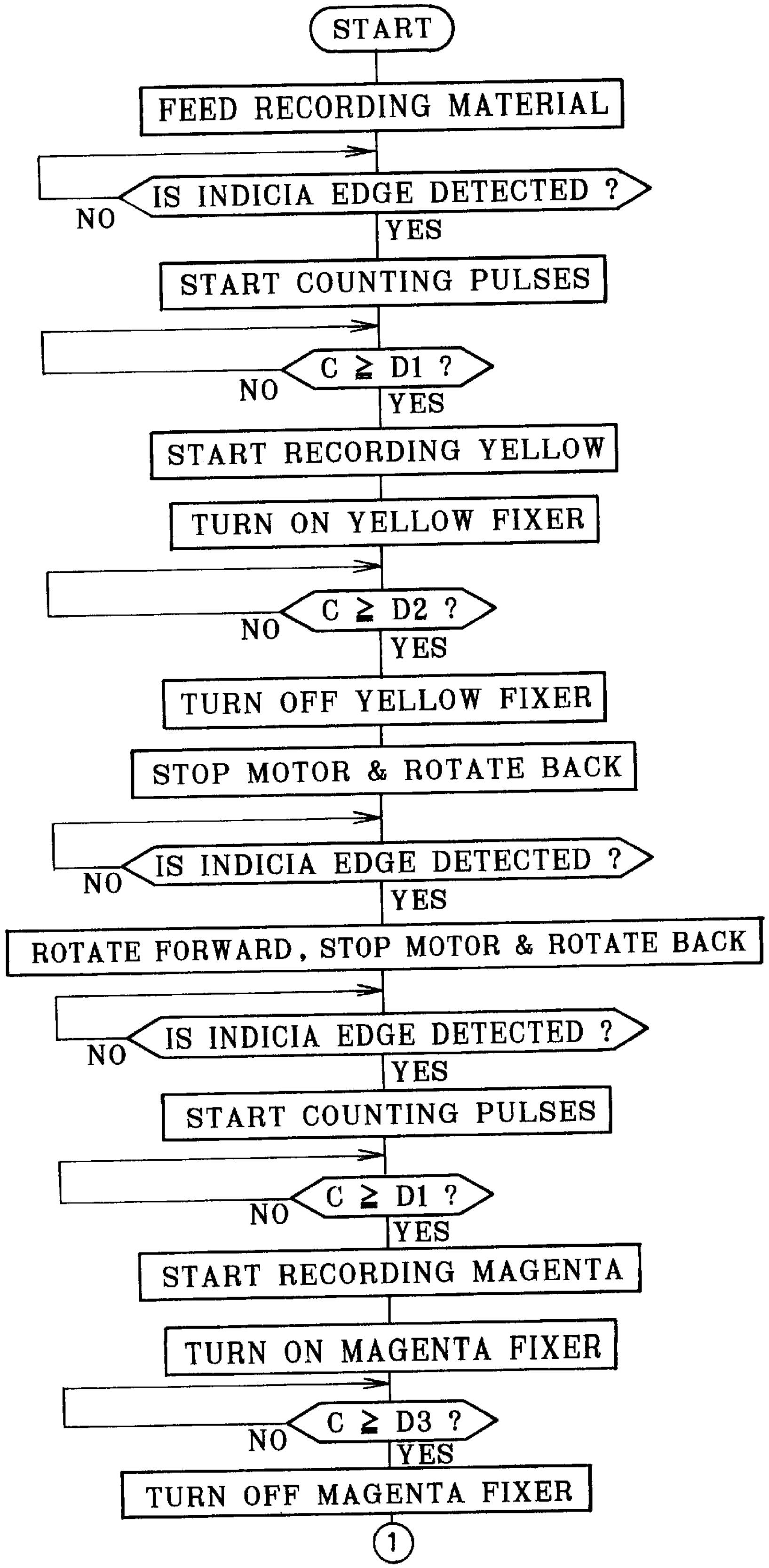
FIG. 8A is a flow chart illustrating a first half of a printing process.
Figure 8B:
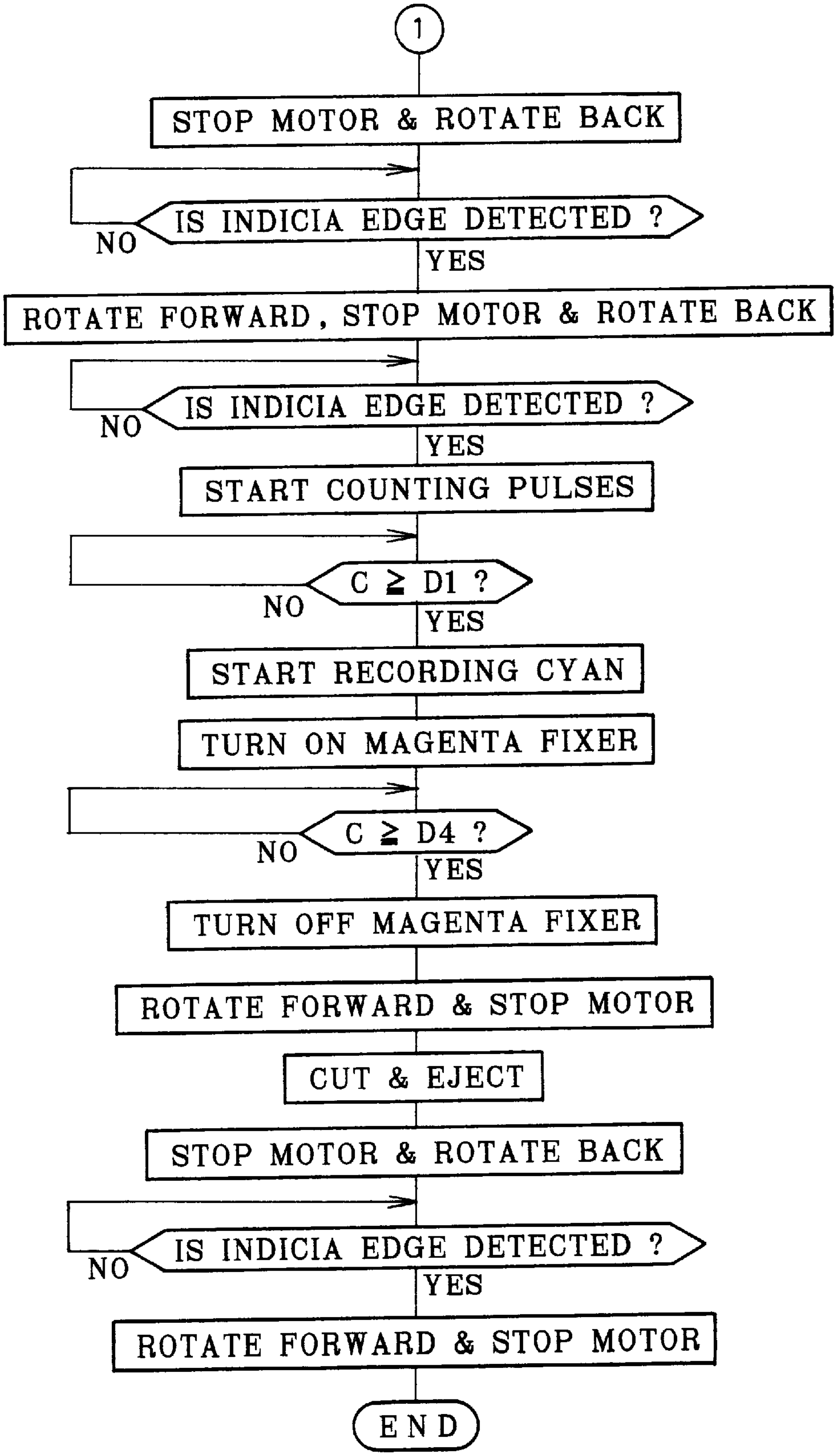
FIG. 8B is a flow chart illustrating a second half of the printing process.

In FIGS. 8A and 8B, a flow of the printing operation is depicted. At first, the stepping motor 42 is rotated to feed the recording material 10 toward the thermal head 34. When the indicia sensor 33 detects the indicia starting edge 13*a* of the positioning indicia 13, a pulse counter 45 as length measurer in the information reader starts counting the number of drive pulses supplied to the stepping motor 42. When the counted number C in the pulse counter 45 becomes equal to or more than the reference value D1, it is detected that the printing starting edge 12*a* of the printing region 12 has reached the heating element array 34*a*. A yellow image starts being recorded at first.

The printing control block 32 effects image processing according to the printing command signal from the system control block 31, and transfers yellow-recording drive data to the thermal head 34 line after line in synchronism with the feeding of the recording material 10. Thus, the heating elements of the thermal head 34 are driven to record a yellow image by one line in synchronism with the recording material feeding. A yellow fixer lamp 36*a* is turned on during recording of the yellow image, applies rays to the printing region 12 with the yellow image recorded, and fixes the yellow image optically.

Even after recording the yellow image, the recording material 10 continues being fed. When the counted number C in the pulse counter 45 becomes equal to or more than the reference value D2, it is detected that a printing ending edge 12*b* of the printing region 12 with the yellow image has reached a ray applying region of the yellow fixer lamp 36*a*. Then the yellow fixer lamp 36*a* is turned off. The stepping motor 42 is stopped, and then rotated back to return the recording material 10.

By returning the recording material 10, the indicia sensor 33 detects the indicia starting edge 13*a* of the positioning indicia 13. The stepping motor 42 rotates at a predetermined amount and then stops, to terminate the returning process of the recording material 10. Then the stepping motor 42 rotates forwards, to record a magenta image in the printing region 12 similarly. The pulse counter 45 starts counting in response to the starting edge detecting signal of the indicia sensor 33. The printing starting position and fixation terminating position are determined according to the counted number C in the pulse counter 45. In the magenta recording, a magenta fixer lamp 36*b* is turned on to fix the magenta coloring layer in the printing region 12. As the fixer lamps 36*a* and 36*b* are in different positions, the recording material 10 during the magenta fixation is fed at such a greater extent as to reach the same fixation terminating position. After the fixation, the stepping motor 42 is rotated back in the same manner as the yellow recording. The recording material 10 returns to a position of the time before the printing.

Similarly, a cyan image is recorded thermally to the cyan coloring layer. During the cyan recording, the magenta fixer lamp 36*b* is turned on to bleach an unrecorded region. When the counted number C in the pulse counter 45 comes up to the reference value D4, the magenta fixer lamp 36*b* is turned off to terminate the bleaching. After this, the stepping motor 42 rotates at a predetermined amount and then stops. A cutting reference line 46 is set at a cutter 47. The cutter 47 is then driven to cut the recording material 10 along the cutting reference line 46. The stepping motor 42 rotates forwards, and causes an ejector roller set 48 to eject the recording material 10 to a tray 49. Then the stepping motor 42 rotates back, to return the recording material 10 to a position where the indicia starting edge 13*a* of the positioning indicia 13 moves past the indicia sensor 33. The printing operation is terminated, to set the ready mode.

Instead of the above-described direct inputting of the distance data B by use of the keyboard 24*b*, the distance data B may be input by use of table data 50 as position information of FIG. 9. The table data 50 is stored in EEPROM 24*c* or non-volatile memory. A particular one of numerals "1, 2 and 3" is input for determining the distance data B. If recording material 10 with the distance data A of 5 mm is used, the numeral 2 is selected. Then the distance data B is determined 7 mm, as associated with the numeral 2. The reference value D1 is calculated according to the distance data B. It is noted that the reference value D1 may be determined in accordance with the distance data A of the recording material 10 of a selected type. For this construction, an equation or table data between the distance data A and reference value D1 is predetermined and stored. The distance data A is input manually by the keyboard. Then the reference value D1 is calculated according to the distance data A and the equation or table data.

Note that EEPROM 24*c* in the embodiment may be a read only memory (ROM) without rewritability. Also, inputting of any one of the numerals "1, 2 and 3" may be both manual and automatic. If the printer includes a construction for discerning the type of the recording material 10, the numerals can be input automatically according to the discerned type.

Figure 10:
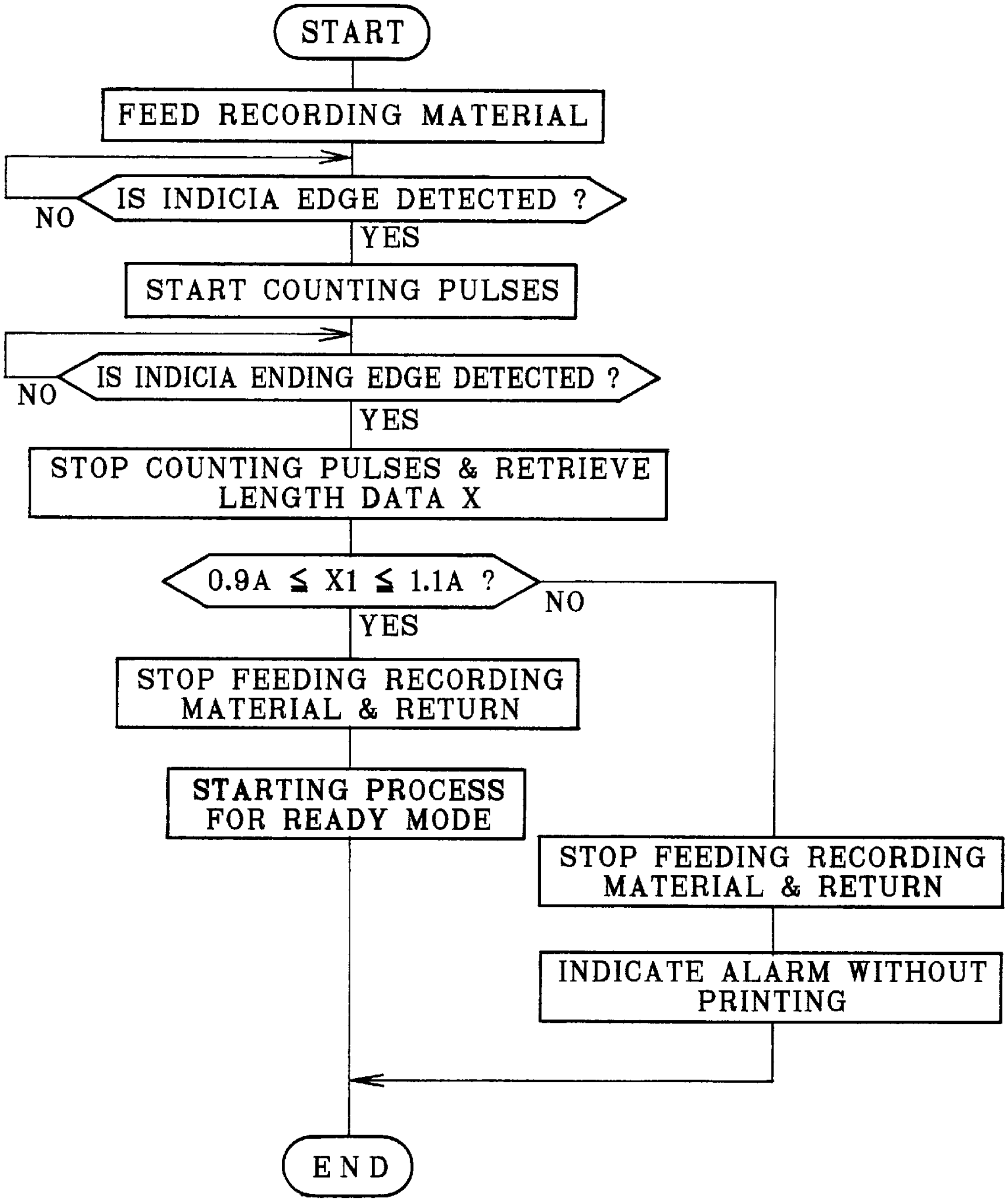
FIG. 10 is a flow chart illustrating an embodiment with a type discerning process in which a recording material type is verified and classified.

In the above embodiment, there is no check of the type of the recording material 10. FIG. 10, in contrast, illustrates an embodiment with operation of checking appropriateness of the type of the recording material 10 to the thermal printer section 22 in response to powering of the printer.

In the present embodiment, the size of the positioning indicia 13 in the feeding direction is plural predetermined values according to differences in the distance between the positioning indicia 13 and the cuttable line segment 14*a* of the sticker regions 15, and constitutes discernment information different between the types. For example, if the recording material 10 has the distance data A of 3 mm and the distance data B of 5 mm, then the size L2 of the positioning indicia 13 in the feeding direction is 3 mm. If the recording material 10 has the distance data A of 5 mm and the distance data B of 7 mm, then the size L2 of the positioning indicia 13 is 4 mm. If the recording material 10 has the distance data A of 7 mm and the distance data B of 9 mm, then the size L2 of the positioning indicia 13 is 5 mm.

By counting the drive pulses for the stepping motor 42, a feeding amount of the recording material 10 is detected, the amount being after the detection of the indicia starting edge 13*a* of the positioning indicia 13 at the indicia sensor 33. If the counted number C is a pulse number converted value X of the respective lengths or in the tolerable range of ±10% from this value, then the recording material 10 is stopped and returned. The starting process is effected, to set the ready mode. If the counted number C does not satisfy this condition, the recording material 10 is detected improper. Then feeding of the recording material 10 is stopped, and then the recording material 10 is returned. The display panel 25 is caused to indicate an alarm sign or notice informing impropriety, and sign or notice for instructing a call to an operator. Also, a buzzer or sound source is drive to emit an alarm sound. This operation is depicted in FIG. 10.

In the present embodiment, information of each of the three types of the recording material is input automatically. There is no key operation of the keyboard of manually inputting any of the three types. However, information of the three types may be manually input.

Although the type of the recording material 10 is discerned upon powering the printer according to the above embodiment, the type of the recording material 10 may be discerned upon reloading or exchanging the recording material 10. Furthermore, the type may be discerned upon a user's insertion of cash for starting printing. If the type is detected not to be included in types allowed by the printer, then the display panel 25 is caused to indicate an alarm sign or notice informing impropriety. Then the recording material 10 is replaced with an allowed type. Furthermore, if the printer is powered again without changing the recording material 10, then the display panel 25 indicates a sign or notice for instructing a call to an operator. The operator checks the type of the recording material 10, inputs distance data B according to the type, and changes the reference value D1 to a value suitable for the type. Then printing is allowed. It is also possible for the operator only to replace the recording material 10 with an allowed type.

Figure 11:
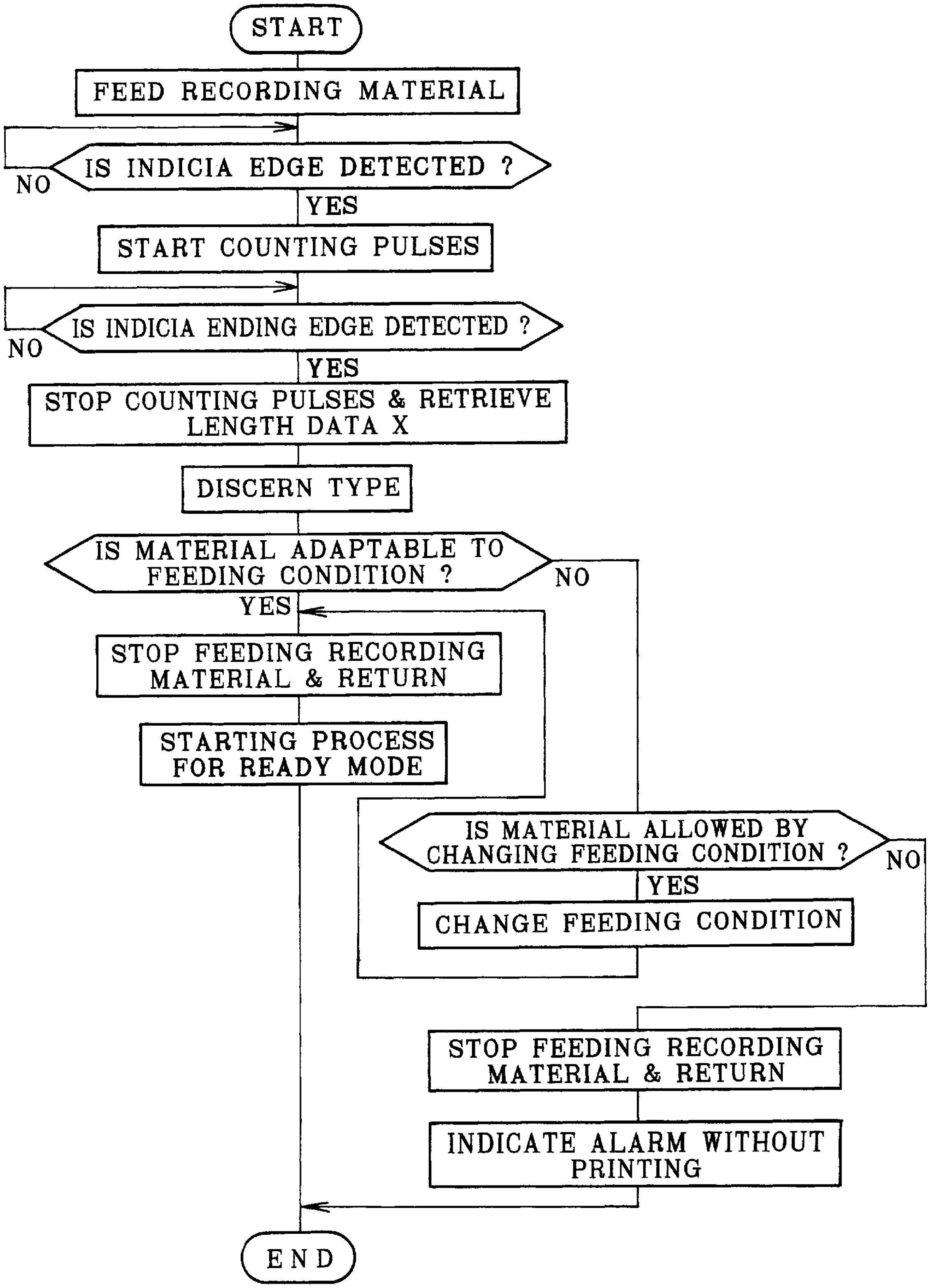
FIG. 11 is a flow chart illustrating another preferred type discerning process in which a recording material feeding condition is adjustable.

In FIG. 11, another preferred embodiment is depicted, in which an improper type of recording material 10 can be treated only by changing a recording material feeding condition. After the type discernment of the recording material 10, it is checked whether the recording material 10 of the discerned type is allowed by the present recording material feeding condition. If the recording material 10 is not allowed, then it is checked whether the recording material 10 is allowed only by changing the recording material feeding condition in a predetermined changeable range. If the recording material 10 is allowed, then the recording material feeding condition is suitably changed. Then the distance information and reference value for the recording material 10 are adjusted. Then the recording material 10 is stopped and returned, before the starting process for ready mode is effected. If the recording material 10 is not allowed only by changing the recording material feeding condition in the predetermined changeable range, then the recording material 10 is stopped and returned. An alarm sign or notice is indicated. Also, the printing is inhibited.

In the above embodiments, each of the host computer 21 and thermal printer section 22 is single. Furthermore, a thermal printer according to the present invention may be constituted by a single host computer and plural thermal printer sections that are not shown, and can be a multi-paper type of printer. A first one of the thermal printer sections is adapted to the use of paper of an ordinary type. A second one of the thermal printer sections is adapted to the use of the recording sticker material. Each thermal printer section is effective only when its associated type of recording material is set. Note that the number of thermal printer sections may be more than three. Also, such thermal printer sections may include one for use with the type with the four sticker regions 15, a second one for use with a type with eight sticker regions 15, and a third one for use with a type with 16 sticker regions 15. Additionally, there may be plural host computers each of which can be connected with one of plural thermal printer sections.

In the above embodiments, the positioning indicia 13 are disposed in the back surface of the recording material 10 opposite to the recording surface. However, the positioning indicia 13 may be arranged in the recording surface in positions outside the printing regions. Also, the recording material 10 may be a cut sheet type of a limited size. Furthermore, the disposition or format of the sticker regions 15 may be in a manner of any matrix. For example, eight sticker regions 15 may be disposed in a manner of two rows and four columns. 16 sticker regions 15 may be disposed in a manner of four rows and four columns. Also, a single sticker region can be disposed in each sheet portion of the recording material 10 in a manner of a full-size. Plural magazines may be used for containing plural types of the recording material 10 that are different in the sticker region format, the recording material 10 being a cut sheet type or a continuous type. The printer may be provided with a selector for selectively designating a desired one of the magazines, and so that a desired one of the sticker region formats can be designated.

In the above embodiments, the positioning indicia 13 are preprinted. However, the positioning indicia 13 may be constituted by holes, openings, cutouts or notches formed by partially cutting or punching the recording material 10. Also, the positioning indicia 13 may be a positioning pattern of metal with conductivity. The printer may be provided with a contact brush that can detect the positioning pattern for the purpose of positioning the recording material 10. In addition, the recording material 10 may have a coating of a magnetic recording layer, in which the positioning indicia 13 may be recorded magnetically.

Furthermore, a sheet type of recording material may lack the positioning indicia 13. A printer may have an edge sensor which may be disposed close to the thermal head 34 and can detect a cut edge or advancing edge of the recording material.

Figure 13:
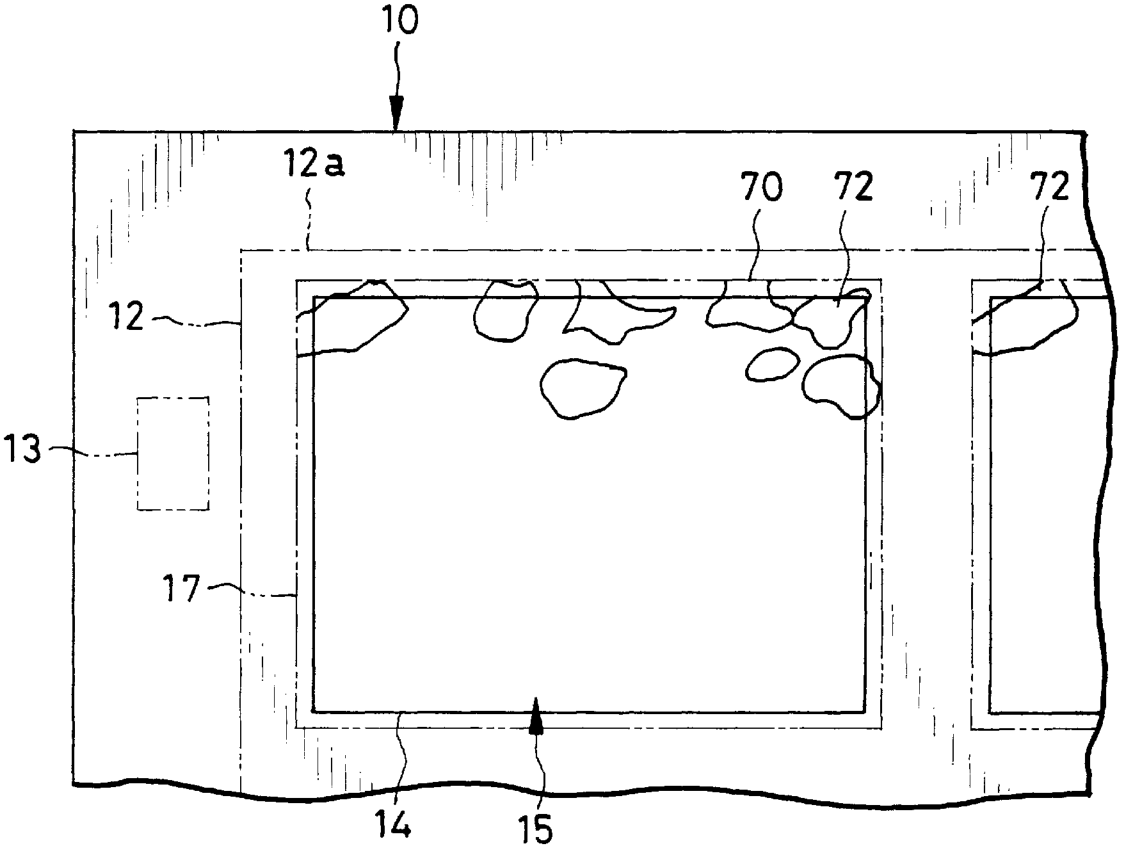
FIG. 13 is a plan illustrating another preferred recording material with preprinted pattern images.

Furthermore, the printer may be combined with another preferred recording material 10 of FIG. 13 having plural preprinted pattern images 72, such as peripheral line images, background images, foreground images, character images and the like preprinted in respectively unit regions for the thumbnail images. Also in the present embodiment, the reference value D1 is calculated by positions of each positioning indicia 13 and a reference portion 70 of the preprinted pattern images 72. In according to this, the printing starting edge 12*a* is determined.

It is to be noted that the preprinted pattern images 72 can be provided with a contour equal to or larger than the sticker regions 15 defined by the cuttable lines 14, so as to suppress creation of blank margins of the sticker regions 15. It is, however, possible to provide preprinted pattern images 72 with a contour smaller than the sticker regions 15, so as to create blank margins of the sticker regions 15 with a modified appearance.

The recording material 10 according to the present invention also may be a thermal development transfer recording material, a sublimation type of thermal transfer recording material, and the like. The advantage of the present invention typically depicted in FIG. 6 can be achieved with any type of recording material that has changeable quality related to printing with changes in the preserving condition in distribution routes. For example, the recording material may be an ink jet recording paper, silver halide photographic material and the like. The recording material may be instant photographic film, and any other types of photosensitive materials.

For use with a photosensitive material, images may be recorded by the line exposing recording, and also by frame exposing recording in which portions included in one frame are recorded by one exposure. The printer according to the present invention can be any types according to frame recording methods.

In addition to the positioning indicia 13, a bar code or other optical information of any shape may be used for detecting the recording material 10 or type discernment. Discernment information for the recording material type may be disposed in a cassette or package for containing the recording material 10. In the above embodiments, the positioning indicia 13 are optically readable. However, the recording material 10 may have other readable information for the type discernment, which may be a discernment code stored in an IC memory or the like.

The discernment information of the recording material 10 is the size of the positioning indicia 13 in the feeding direction according to the above embodiments, but may also be a pitch of the positioning indicia 13 or the size of the positioning indicia 13 as viewed crosswise to the feeding direction. Also, an additional indicia may be preprinted beside the positioning indicia 13, so that the discernment information may be represented by a distance between the additional indicia and positioning indicia 13. Also, the shape of the positioning indicia 13 may be determined to represent the type of the recording material 10. The printer can include an image area sensor and the like for detecting the shape of the positioning indicia 13. The detected shape can be compared with a stored pattern, to discern the type.

Figure 12:
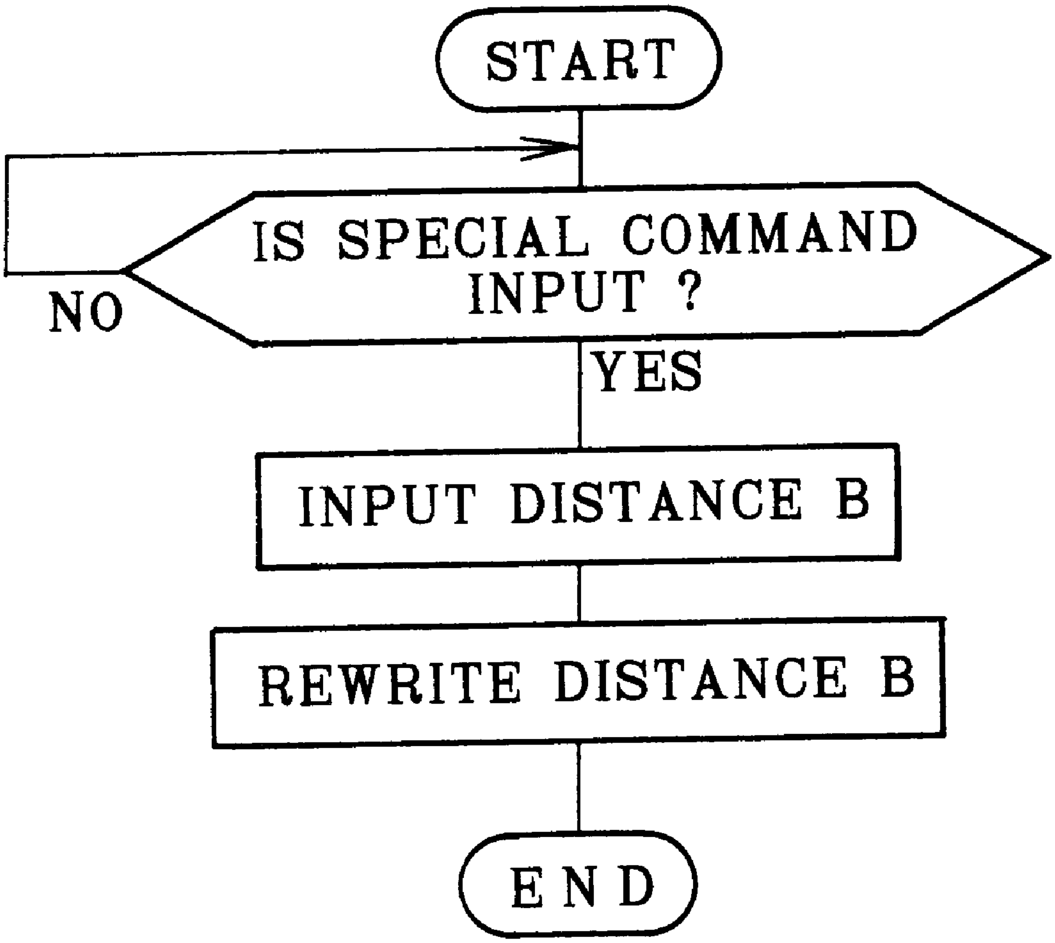
FIG. 12 is a flow chart illustrating a preferred embodiment in which a special command signal is used in place of the password.

Instead of the use of the password in the above embodiments, a special command signal or hidden command signal may be used as depicted in FIG. 12, the special command signal being input when particular keys in a special combination in the keyboard are depressed. After the special command signal is recognized, inputting of the distance B and/or the reference value D1 is allowed. It is also possible to use the external operation panel instead of the inner keyboard for inputting the distance B and/or the reference value D1. This is because ordinary users or purchasers are kept from knowing a method of inputting the special command signal.

In the above embodiments, the reference value is changed to change the printing starting edge by inputting the distance data. However, the image data or the drive data to be transferred to the thermal head 34 may be modified to shift a position of the combined image in the feeding direction, so as to absorb the difference between the types. For example, let an original starting position of the thumbnail images 17 be line No. 10 as counted from a reference starting position. The reference starting position can be shifted to line No. 5 or 15, to shift the entirety of the combined image in the downstream direction.

This being so, the distance data B to be input may be replaced with the number of line by which the combined image should be shifted. In any of the embodiments, a value to be input as type changing information may be in any unit, for example the number of drive pulses for the stepping motor.

Furthermore, in any of the embodiments, a value to be input as type changing information may be a correction value or difference value by which the distance data B or the reference data D1 can be increased or decreased.

In the present invention, the printing reference position of the printing region may not be the printing starting position for the start of the driving the heating elements according to image data, but may be a position of starting preheating by pressing the thermal head to the recording material 10. Any suitable position can be predetermined as reference position for recording an image without occurrence of a shift from the sticker regions 15 or preprinted pattern images 72. In the above embodiments, the feeding amount associated value is obtained from the number of the drive pulses for the stepping motor. Alternatively, a pulse encoder can be used, which is rotated by contact with the recording material 10, to obtain the feeding amount associated value.

Furthermore, the recording material 10 may be positioned in a thermal printer in a stationary manner. The thermal printer may have a movable thermal head, which can be fed with reference to the stationary recording material 10.

In the above embodiments, the distance A is smaller than the distance B to suppress creation of blank margins of sticker regions. However, the distance A between the indicia starting edge 13*a* and cuttable line segment 14*a* may be greater than the distance B from the indicia starting edge 13*a* to the printing starting edge 12*a* of the printing region 12 to create blank margins of sticker regions.

In the above embodiments, the cuttable lines 14 are half cut lines. However, the cuttable lines 14 may be trains of perforations that come through the recording material 10 including the release paper.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer usable with a recording material having a positioning indicia disposed in a predetermined position, said printer comprising:

a printing head for recording an image to said recording material;

a feeder for feeding said recording material relative to said printing head;

an indicia sensor, disposed in a predetermined position with respect to said printing head, for detecting said positioning indicia in said recording material;

a memory for storing first position information adapted to image recording to a predetermined first type of said recording material;

an input unit for inputting type changing information representing a second type of said recording material at a time of image recording to said second type, to set second position information; and a control unit for monitoring a sensor output of said indicia sensor while said feeder operates, for obtaining a feed length of said recording material relative to said printing head with reference to said positioning indicia in response to said sensor output, for driving said printing head with said first type of said recording material when said feed length comes up to a first distance according to said first position information, and for driving said printing head with said second type of said recording material when said feed length comes up to a second distance according to said second position information, to control recording of said image in first and second printing regions suitable to respectively said first and second types.

2. A printer as defined in claim 1, wherein said control unit writes said second position information to said memory in place of said first position information in response to said type changing information.

3. A printer as defined in claim 2, wherein said memory is EEPROM;

said second position information is said type changing information, or information obtained according to said type changing information and a predetermined calculation equation.

4. A printer as defined in claim 3, further comprising:

a lid for covering said input unit; and a lock mechanism for keeping said lid closed to disable external operation to said input unit, said lock mechanism allowing said lid to open in response to unlocking operation, to enable said input unit to operate.

5. A printer as defined in claim 1, wherein said input unit further inputs a predetermined special signal externally;

said control unit allows setting of said second position information upon recognition of said special signal.

6. A printer as defined in claim 1, wherein said feeder includes a stepping motor, supplied with drive pulses by said control unit, for rotating to feed said recording material;

further comprising a pulse counter for counting said drive pulses to obtain a pulse number representing said feed length.

7. A printer as defined in claim 1, wherein said second type is predetermined;

said memory further stores said second position information;

said control unit selectively reads said first and second position information according to presence and absence of said type changing information.

8. A printer as defined in claim 1, wherein said memory stores table data which is constituted by at least said first and second position information, and in which an address of said first position information is type information of said first type and an address of said second position information is type information of said second type;

said type changing information is said type information of at least said second type.

9. A printer as defined in claim 1, wherein said recording material includes discernment information of one recording material type;

further comprising an information reader for reading said discernment information from said recording material;

said memory further stores type information of said first and second types;

said control unit detects which of said first and second types said recording material is according to said type information and said discernment information;

said input unit is operated if said recording material is said second type.

10. A printer as defined in claim 9, wherein if said discernment information is different from said type information, said control unit inhibits said printing head from operating and/or generates an alarm signal.

11. A printer as defined in claim 9, further comprising a length measurer for measuring said feed length;

wherein said discernment information is a size of said positioning indicia in a feeding direction;

said information reader is constituted by said indicia sensor and said length measurer.

12. A printer as defined in claim 9, wherein said discernment information is one of a shape of said positioning indicia, a size or pitch of said positioning indicia in a feeding direction, and a size of said positioning indicia as viewed crosswise to said feeding direction;

said information reader includes said indicia sensor.

13. A printer as defined in claim 9, wherein said memory further stores a predetermined tolerable condition predetermined to allow said printing head to operate by changing a recording material feeding condition for recording material different from said first and second types;

wherein if said recording material is different from said first and second types, said control unit checks said discernment information according to said tolerable condition, and when said discernment information satisfies said tolerable condition, allows said printing head to operate by changing said recording material feeding condition.

14. A printer as defined in claim 1, wherein said first and second types include respectively first and second cuttable lines, formed along a periphery of said first and second printing regions, for keeping said first and second printing regions cuttable away.

15. A printer as defined in claim 14, wherein said first printing region includes a first group of plural subregions, said second printing region includes a second group of plural subregions, and said image is recorded in each of said subregions;

said first and second cuttable lines are formed along a periphery of said subregions included in respectively said first and second groups.

16. A printer as defined in claim 14, wherein said first and second position information is so determined that a distance between said first cuttable line and an edge of said first printing region is set equal to a distance between said second cuttable line and an edge of said second printing region.

17. A printer as defined in claim 16, wherein said first and second position information is so determined that said first and second printing regions extend downstream from said first and second cuttable lines with reference to a feeding direction.

18. A printer as defined in claim 1, wherein said first and second types include respectively first and second preprinted pattern images preprinted close to a periphery of said first and second printing regions.

19. A printer as defined in claim 18, wherein said first printing region includes a first group of plural subregions, said second printing region includes a second group of plural subregions, and said image is recorded in each of said subregions;

said first and second preprinted pattern images are disposed close to a periphery of said subregions included in respectively said first and second groups.

20. A printer as defined in claim 18, wherein said first and second printing regions have first and second printing starting edges positioned downstream with reference to a feeding direction;

said first and second preprinted pattern images include a predetermined reference portion;

said first and second position information is so determined that a distance between said reference portion and said first printing starting edge is set equal to a distance between said reference portion and said second printing starting edge.

21. A printer as defined in claim 1, wherein said recording material is a sticker.

22. A printer as defined in claim 1, further comprising a pick-up unit for picking up an object to generate image data of said image;

wherein said printing head records said image to said recording material according to said image data.

23. A printer as defined in claim 22, further comprising:

an additional image memory for storing said image data of a predetermined additional image;

an image combining circuit for producing image data of a combined image by combining said image and said additional image;

wherein said printing head records said combined image to said recording material according to said image data of said combined image.

* * * * *